US007692983B2

United States Patent
Lee et al.

(10) Patent No.: US 7,692,983 B2
(45) Date of Patent: Apr. 6, 2010

(54) MEMORY SYSTEM MOUNTED DIRECTLY ON BOARD AND ASSOCIATED METHOD

(75) Inventors: Jung-Bae Lee, Kyungki-do (KR); Hoe-Ju Chung, Kyungki-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 271 days.

(21) Appl. No.: 11/745,965

(22) Filed: May 8, 2007

(65) Prior Publication Data
US 2007/0250658 A1 Oct. 25, 2007

Related U.S. Application Data

(63) Continuation-in-part of application No. 10/750,093, filed on Dec. 31, 2003, now Pat. No. 7,227,796.

(30) Foreign Application Priority Data
May 2, 2003 (KR) .............................. 2003-28175

(51) Int. Cl.
*G11C 5/02* (2006.01)
*H03H 7/38* (2006.01)
(52) U.S. Cl. .................. 365/198; 365/191; 365/230.08; 365/233.11; 365/233.1; 365/51; 365/63; 326/30; 333/33; 333/32; 333/124
(58) Field of Classification Search ................ 365/51, 365/63, 230.08, 198, 191, 233.11, 233.12, 365/233.1; 326/30; 333/33, 32, 125, 124
See application file for complete search history.

(56) References Cited

U.S. PATENT DOCUMENTS 5,321,664 A 6/1994 Akimoto

| 5,650,757 | A | 7/1997 | Barber |
| 5,896,346 | A | 4/1999 | Dell et al. |
| 6,034,878 | A | 3/2000 | Osaka et al. |
| 6,229,727 | B1 | 5/2001 | Doyle |
| 6,414,868 | B1 | 7/2002 | Wong et al. |
| 6,519,173 | B2 | 2/2003 | Funaba et al. |
| 6,621,371 | B2 * | 9/2003 | Lee .............................. 333/33 |
| 6,917,546 | B2 | 7/2005 | Matsui |
| 7,227,796 | B2 * | 6/2007 | Lee et al. ..................... 365/198 |
| 2002/0161968 | A1 | 10/2002 | Yoo et al. |
| 2003/0081444 | A1 | 5/2003 | Cordes et al. |

FOREIGN PATENT DOCUMENTS

| DE | 102004022347 A1 | 12/2004 |
| JP | 2004-334879 | 11/2004 |
| KR | 2002-0066381 | 8/2002 |

OTHER PUBLICATIONS

English language abstract for Korean Publication No. 2002-0066381.
English language abstract for Japanese Publication No. 2004-334879.
"Sinclair ZX81", http://de.wikipedia.org/wiki/Sinclair_ZX81, Nov.10, 2005, 12 pages.

* cited by examiner

*Primary Examiner*—Andrew Q Tran
(74) *Attorney, Agent, or Firm*—Muir Patent Consulting, PLLC

(57) ABSTRACT

The invention provides an improved memory system that addresses signal degradation due to transmission line effects. The improved memory system includes a first buffer, at least one first memory device coupled to the first buffer, and a plurality of signal traces. The first buffer and memory device are mounted on a motherboard. Likewise, the plurality of signal traces is routed on the motherboard. Doing so eliminates stub loads that cause signal reflection that, in turn, result in signal degradation.

20 Claims, 10 Drawing Sheets

MEMORY SYSTEM MOUNTED DIRECTLY ON BOARD AND ASSOCIATED METHOD

CROSS REFERENCE TO RELATED APPLICATIONS

This application is a continuation-in-part of U.S. patent application Ser. No. 10/750,093, filed Dec. 31, 2003, now U.S. Pat. No. 7,227,796, which claims priority from Korean patent application no. 2003-28175, filed May 2, 2003. We incorporate U.S. application Ser. No. 10/750,093 and Korean application no. 2003-28175 by reference in their entireties.

BACKGROUND OF THE INVENTION

1. Field of the Invention

The present invention relates to an improved memory system mounted directly on a motherboard and an associated method.

2. Description of the Related Art

Most computer systems allow for memory expansion using memory modules. Memory modules—for example, single inline memory modules (SIMMs) and/or dual inline memory modules (DIMMs)—are small, compact circuit boards that are designed to connect easily into an expansion socket mounted on a main circuit or motherboard.

FIGS. 1 and 2 are diagrams of computer system 100's memory architecture. Referring to FIGS. 1 and 2, a system 100 includes a plurality of memory modules 106 controlled by a memory controller 104. The memory controller 104 controls read and write operations relating to the memory modules 106. The memory controller 104 is mounted on the main or motherboard 102. The operation of the memory controller 104 is well known to a person of reasonable skill in the art and will not be discussed any further.

The memory modules 106 oftentimes include edge connectors 114 comprising a plurality of contact pads 116. The contact pads 116 are typically present at both sides of the modules 106. A plurality of receptacles, e.g., sockets 112, is mounted on the motherboard 102. The sockets 112 receive the edge connectors 114 to thereby electrically couple the motherboard 102 to the memory modules 106. More particularly, the sockets 112 electrically couple traces routed on the motherboard 102 to traces routed on the memory modules 106.

The memory modules 106 include a plurality of memory devices 108. These memory devices 108 are, for example, dynamic random access memory (DRAM) or synchronous dynamic random access memory (SDRAM). A buffer 110 controls and buffers commands and addresses (C/A) it receives from the memory controller 104. The plurality of memory devices 108 and the C/A buffer 110 are mounted on the memory module 106.

Signal traces are routed on both the motherboard 102 and the modules 106. These signal traces might include a data bus DQ, system clock signal CLK, and C/A bus. The memory devices 108 and the buffer 110 receive signals from a controller 104 through the corresponding socket 112 mounted on the motherboard 102.

In any memory architecture, it is important to maintain the signal integrity of the address, control and clock signals. Maintaining signal integrity becomes more difficult as the operating frequency increases because of transmission line effects, including signal reflection.

In transmission line theory, the connection between the motherboard 102 and the module 106 through the socket 112 is termed a stub load. Stub loads present a transmission discontinuity that results in signal reflection and ultimately, adversely affects signal integrity. Referring to FIGS. 1-3, a signal trace 302, e.g., the data bus DQ, is routed on the motherboard 102. The signal trace 302 is electrically coupled to a signal trace 304 routed on the module 106 through the socket 312. But the socket 312 presents a discontinuity 306 between the signal trace 302 and the signal trace 304. The discontinuity 306 causes a portion of the signal to reflect back injecting noise, as well as, decreasing timing margins and voltage windows.

Referring to FIG. 4, stub resistors 416 in the memory modules 406 reduces signal reflection. But these stub resistors 416 improve memory read and write operations. As the value of the stub resistors 416 increases to decrease reflection, the voltage drop across it increases attenuating the signal voltage. Attenuating signal voltages decrease the voltage window. And the stub resistors 416 might cause RC parasitic loads that delay the signal.

Accordingly, a need remains for a memory system capable of addressing disadvantages associated with existing memory systems.

BRIEF DESCRIPTION OF THE DRAWINGS

The foregoing and other objects, features, and advantages of the invention will become more readily apparent from the detailed description of an embodiment that references the following drawings.

DETAILED DESCRIPTION OF THE PREFERRED EMBODIMENT

Figure 5:
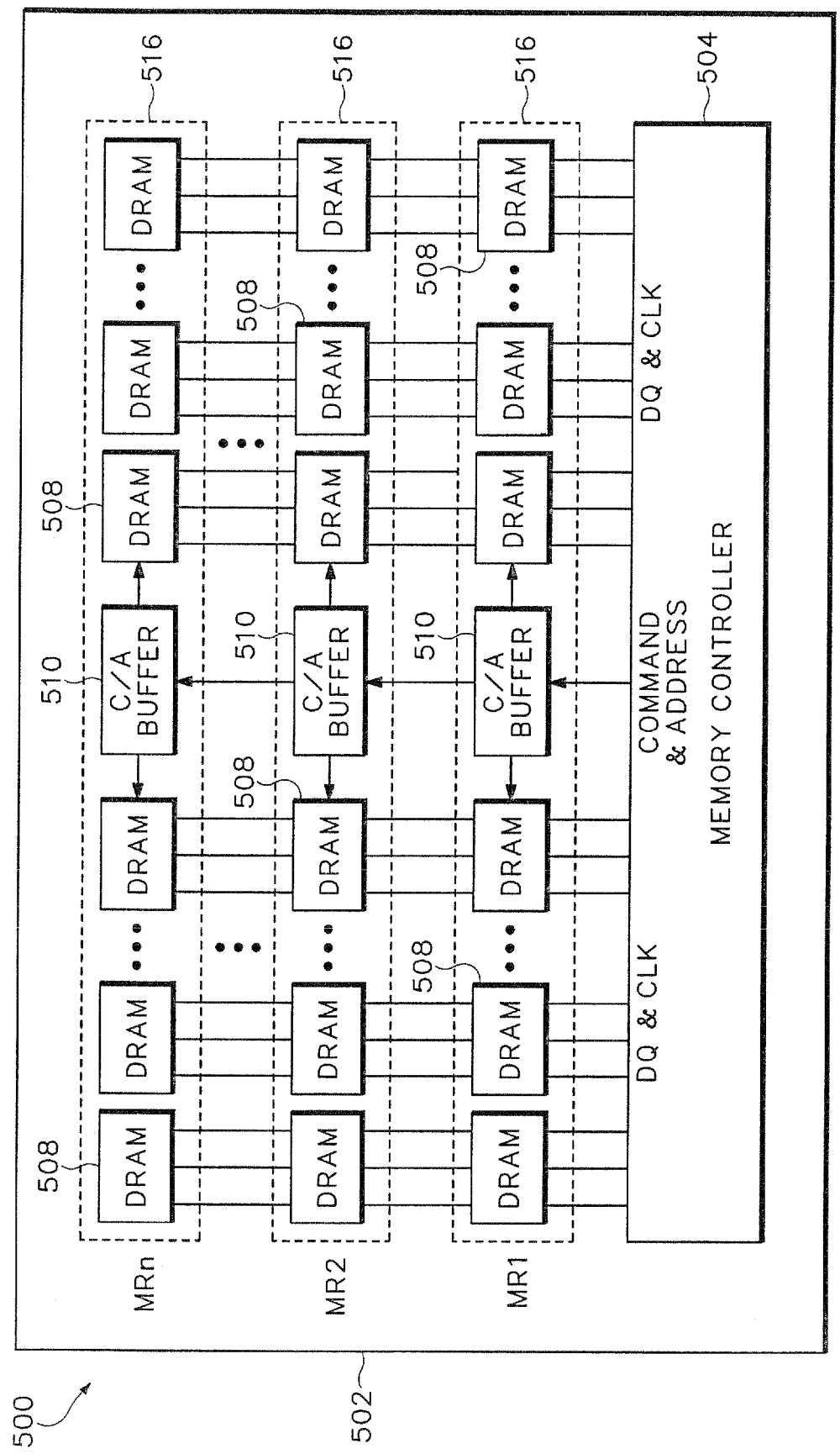
FIG. 5 is a top view of an embodiment of the memory system according to the present invention.
Figure 6:
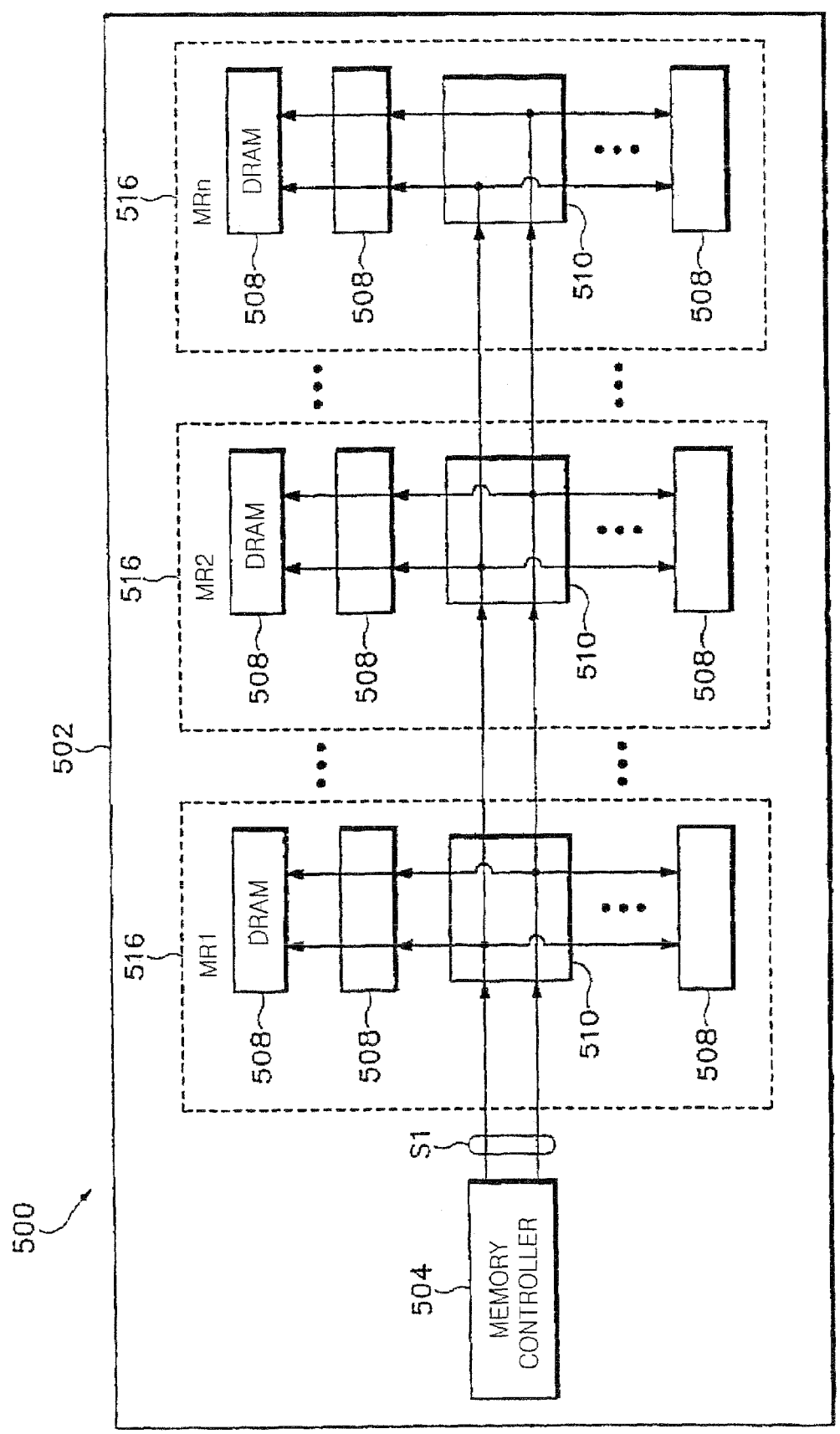
FIG. 6 is a block diagram of the memory system shown in FIG. 5.

FIG. 5 is a top view of a memory system according to the present invention. FIG. 6 is a block diagram of the memory system shown in FIG. 5. Referring to FIGS. 5 and 6, the memory system 500 includes a memory controller 504 that controls a plurality of memory ranks 516. The memory controller 504 controls read and write operations relating to the memory ranks 516. The memory controller 504 is mounted on the motherboard 502. The structure and operation of the memory controller 504 is well known to a person of reasonable skill in the art and will not be discussed any further.

The plurality of memory ranks 516 is mounted directly on the motherboard 502. That is, there is no separate memory module 106 as exists in the system 100.

Each memory rank includes a plurality of memory devices 508 coupled to a buffer 510. The memory devices 508 are directly mounted on the motherboard 502. Each memory device 508 is, for example, a DRAM or SDRAM. The structure and operation of the memory devices 508 is well known to a person of reasonable skill in the art and will not be discussed any further.

The buffer 510 controls and buffers commands and addresses it receives from the memory controller 504. The buffer 510 might be a command and address buffer. The buffer 510 is mounted to the motherboard 502. The buffer 510 might include inverters, drivers, and the like to allow it to drive the plurality of memory devices 508 with the command and address signals it receives from the controller 504. The structure and operation of the buffer 510 is well known to a person of reasonable skill in the art and will not be discussed any further.

Signal traces are routed on the motherboard 502. These signal traces might include a data bus DQ, system clock signal CLK, and command and address bus C/A as shown in FIGS. 5 and 6.

The system 500 operates as follows. The controller generates command and address signals it transmits to the command and address buffer 510 via signal traces routed on the motherboard 502. The plurality of memory devices 508 receive data signals DQ and the system clock signal CLK from the controller 504 or other circuitry on the motherboard not shown in FIG. 5 or 6. If the command signals indicate a read operation, the memory device 508 will provide the data read from the corresponding memory cell indicated by the address signals responsive to the system clock CLK. If the command signals indicate a write operation, the memory device 508 will write the data to the corresponding memory cell indicated by the address signals responsive to the system clock CLK.

The system 500 eliminates stub loads that cause signal reflection by eliminating memory modules. If there are no memory modules, then there is no need for sockets that create transmission line discontinuities. If there are no transmission line discontinuities, then no signal reflection can exist that degrade its integrity in the manner we discussed above.

Figure 7:
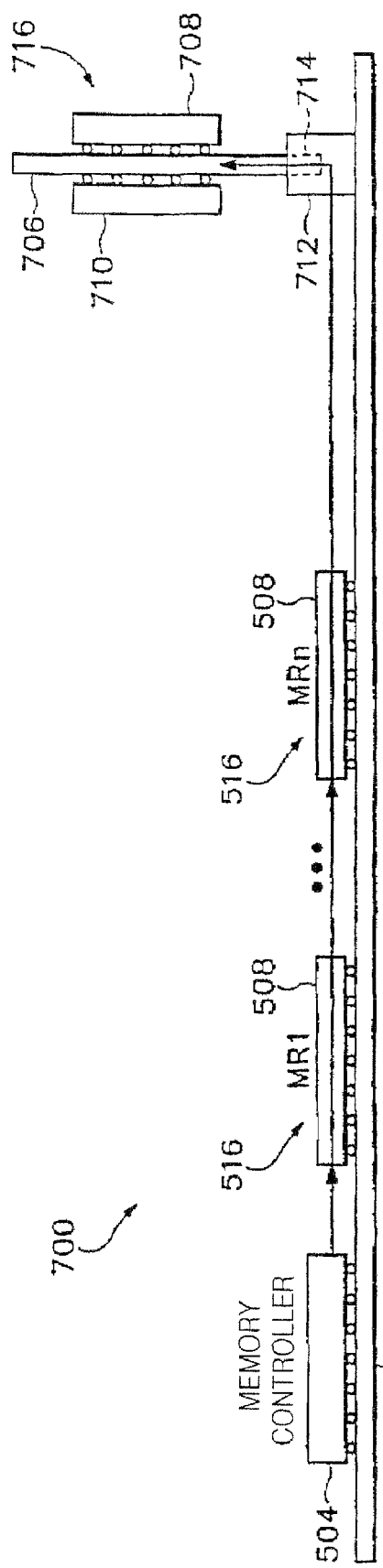
FIG. 7 is a side view of an embodiment of the memory system according to the present invention.

FIG. 7 is a side view of a memory system 700 according to the present invention. Referring to FIG. 7, the system 700 includes the plurality of memory ranks 516 and the controller 504 discussed earlier with reference to FIGS. 5 and 6. The plurality of memory ranks 516 and the controller 504 are mounted on the motherboard 502.

Unlike the system 500, however, the system 700 includes a memory module 716. The memory module 716 might include an edge connector 714 comprising a plurality of contact pads (not shown), a plurality of memory devices (708), a module board (706), and a C/A buffer (710). The contact pads are typically present at both sides of the board 706. A plurality of receptacles, e.g., sockets 712, is mounted on the motherboard 502. The sockets 712 receive the edge connectors 714 to thereby electrically couple the motherboard 502 to the memory module 716. More particularly, the sockets 712 electrically couple traces routed on the motherboard 502 to traces routed on the module board 706 such that the memory module 716 is coupled to the motherboard 502 and the controller 704.

The memory module 716 includes a plurality of memory devices 708. These memory devices 708 are, for example, DRAM and SDRAM. A buffer 710 controls and buffers commands and addresses it receives from the memory controller 704. The plurality of memory devices 708 and the buffer 710 are mounted on the module board 706.

In one embodiment, the memory module 716 is positioned farthest from the controller 704. Doing so eliminates signal reflection because there exists no branch point from signal traces on the motherboard 702. That is, the branch point causes a signal to be transferred in as many directions as points emanating from the branch point, e.g., two or more directions. Undesired signal reflection might occur because of mismatching of a characteristic impedance (Z0) at the branch point.

The signal path between the controller 704 and the memory module 716 extends from the controller 704 to the memory 708 to the memory module 716. Since the memory 708 is soldered directly to the board 706, no signal branch exists at that point and, therefore, no signal reflection. On the other hand, if the memory module 716 is positioned between the controller 704 and memory 708, the connector socket must be located between the signal trace creating a stub or branch from the module trace. This branch will create a signal reflection.

Figure 1:
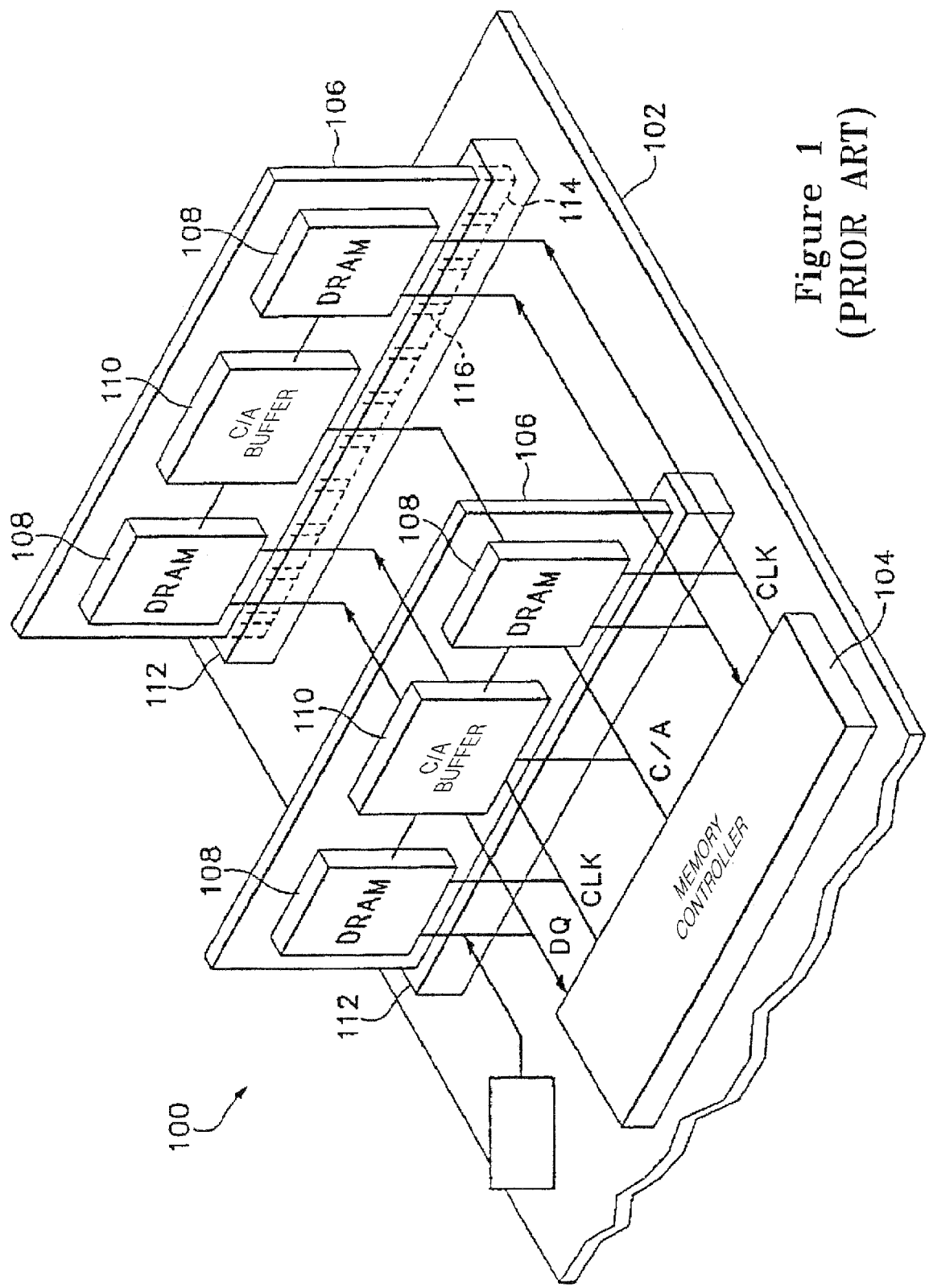
FIG. 1 is a top view of a memory system.
Figure 2:
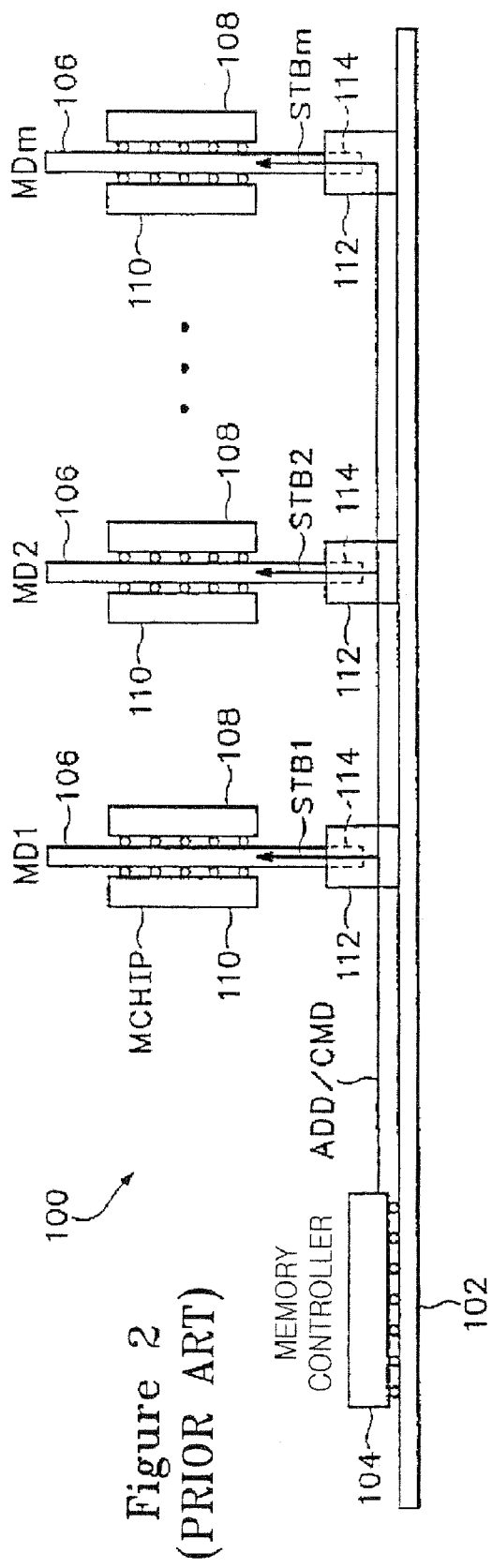
FIG. 2 is a side view of the memory system shown in FIG. 1.
Figure 3:
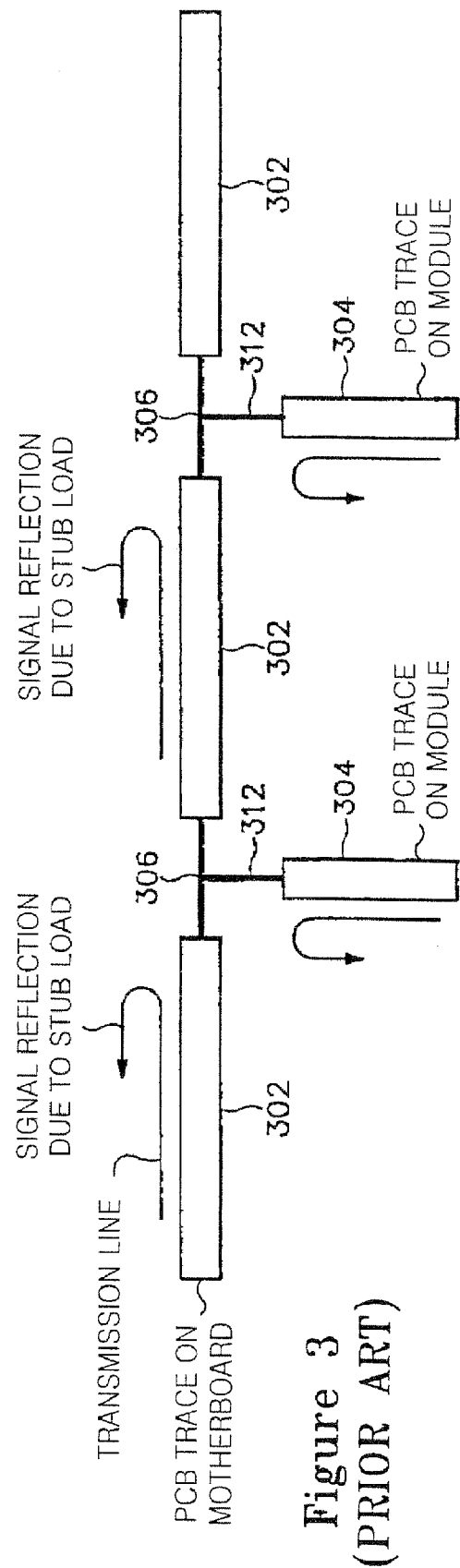
FIG. 3 is a transmission line diagram associated with the system shown in FIG. 1.
Figure 4:
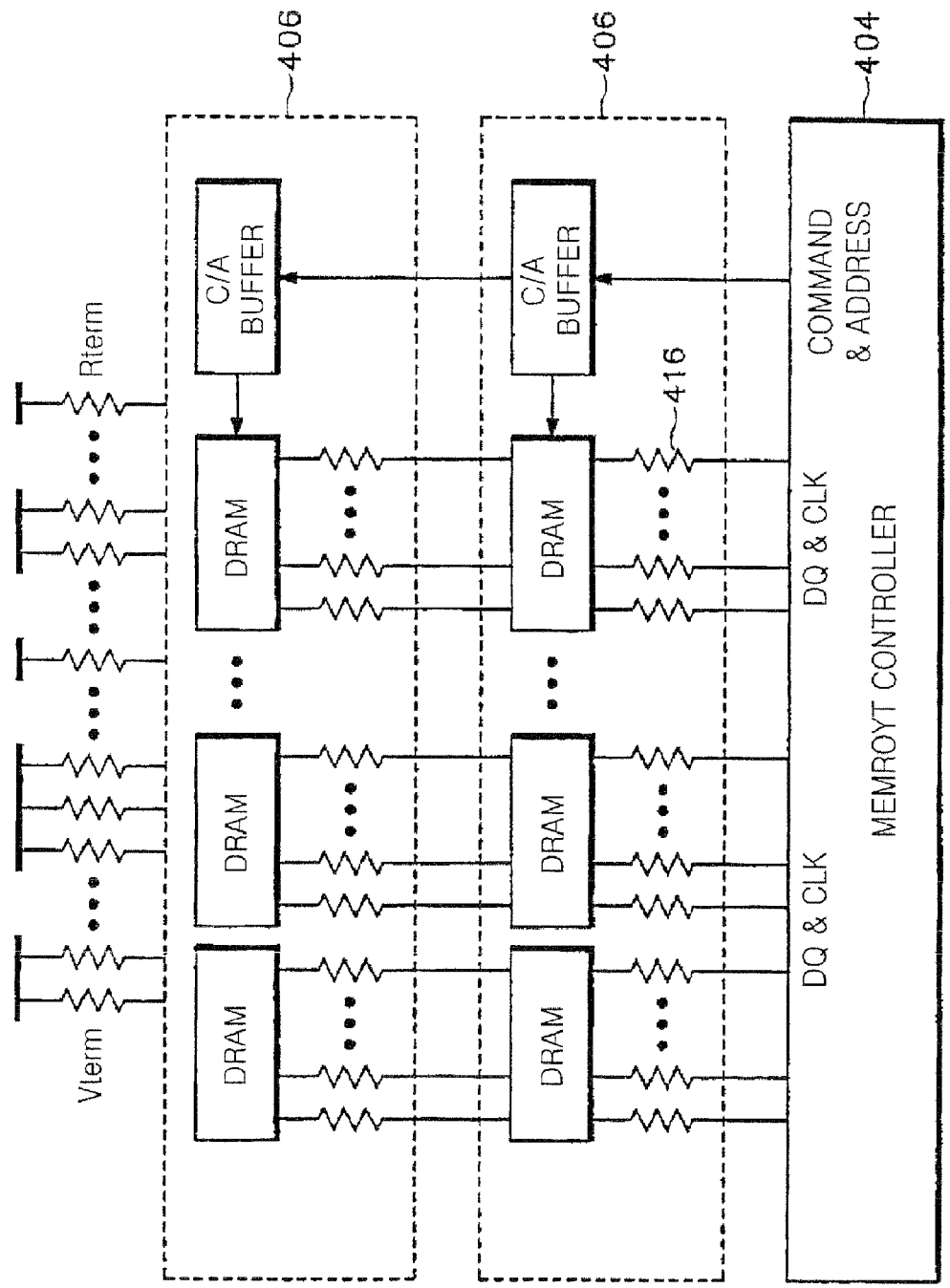
FIG. 4 is a top view of a memory system.
Figure 8:
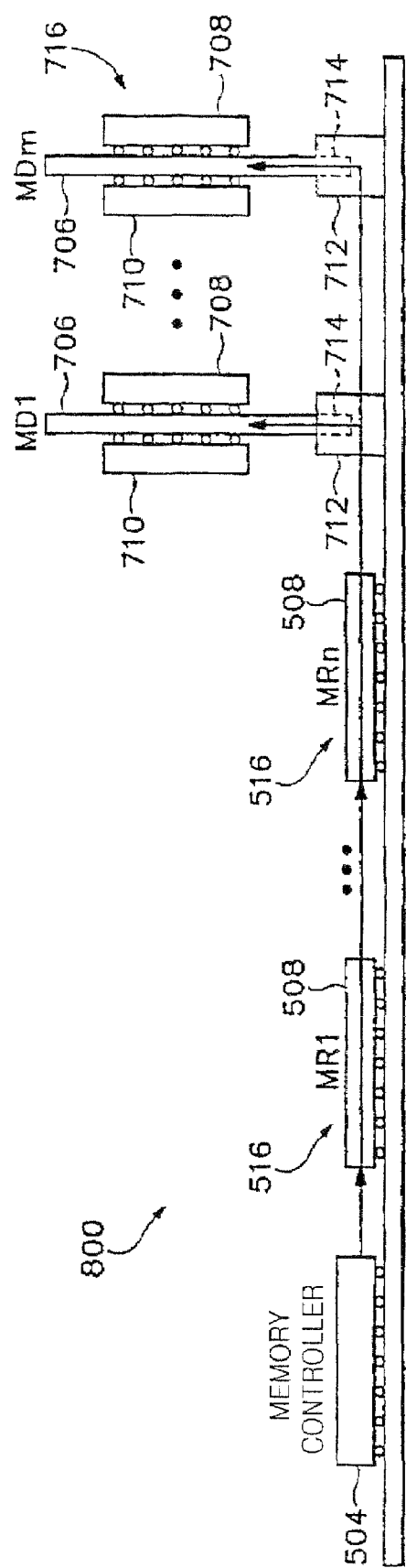
FIG. 8 is a side view of an embodiment of the memory system according to the present invention.

FIG. 8 is a side view of a memory system 800 according to the present invention. The system 800 is substantially similar to the system 700 except that instead of a single memory module 716, the system 800 might include two or more memory modules 716. The system 800 might exhibit some of the disadvantages associated with the system 100 shown in FIG. 1 because a branch points exist from the motherboard 502. This branch point might cause undesired signal reflection that might adversely affect signal integrity. Nonetheless, the system 800 minimizes the signal degradation by mounting the plurality of memory ranks directly on the motherboard 502.

Figure 9:
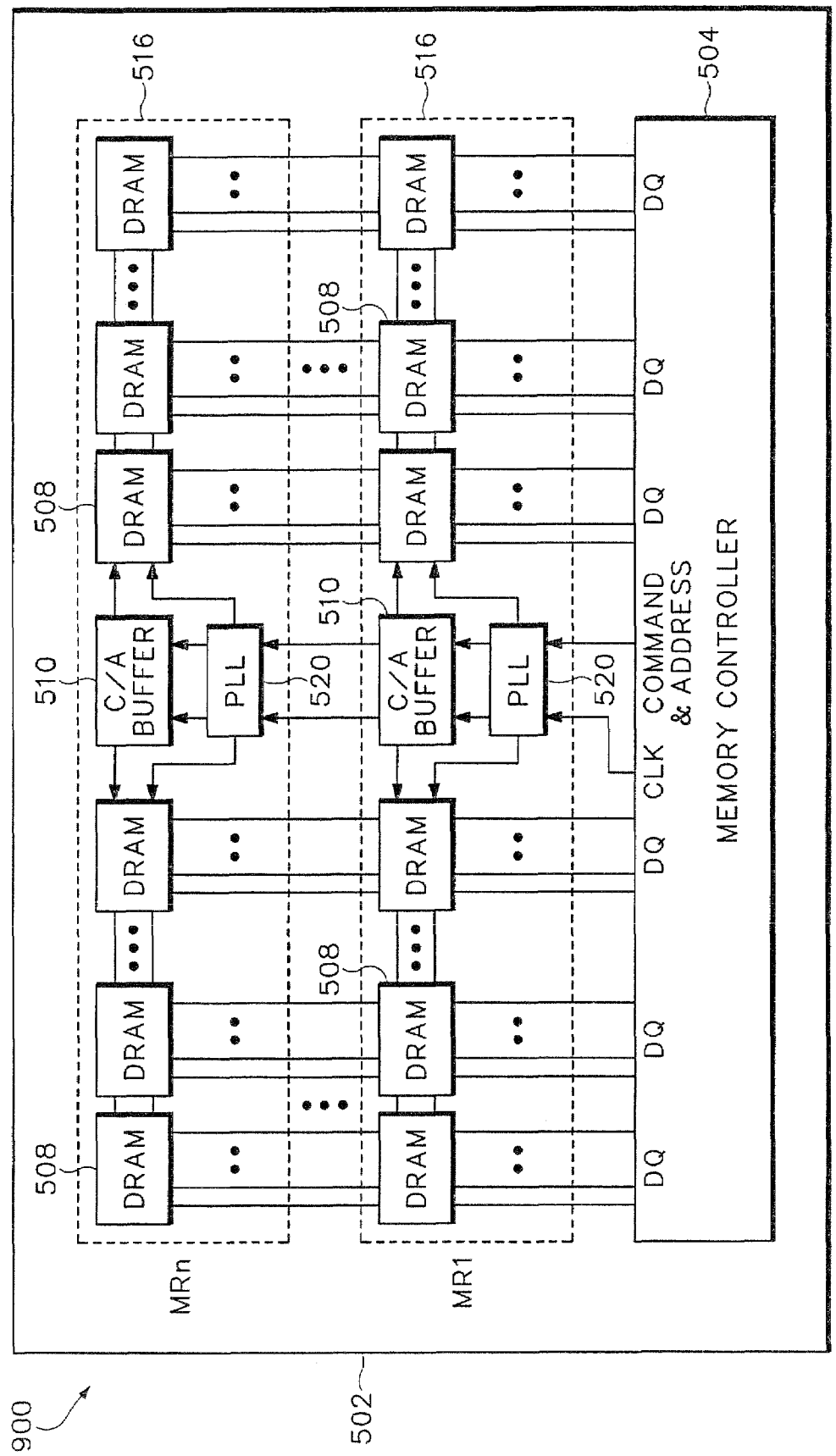
FIG. 9 is a top view of an embodiment of the memory system according to the present invention.

FIG. 9 is a top view of an embodiment of a memory system 900 according to the present invention. The system 900 is substantially similar to the system 500 with the addition of a phase locked loop (PLL) 520 in each memory rank 516. The PLL 520 is capable of generating a first clock 1stCLK responsive to the system clock CLK. The PLL 520 provides the 1stCLK signal to its corresponding memory devices 508. By adding the PLL 520, the system 900 avoids having to route the system clock separately to each memory device 508 from the memory controller 504. In another embodiment, the PLL 520 might likewise be replaced with a delay locked loop (DLL) that operates similarly to the PLL 520. That is, the DLL is capable of generating the 1stCLK responsive the system clock CLK and to provide the 1stCLK to its corresponding memory devices 508.

Figure 10:
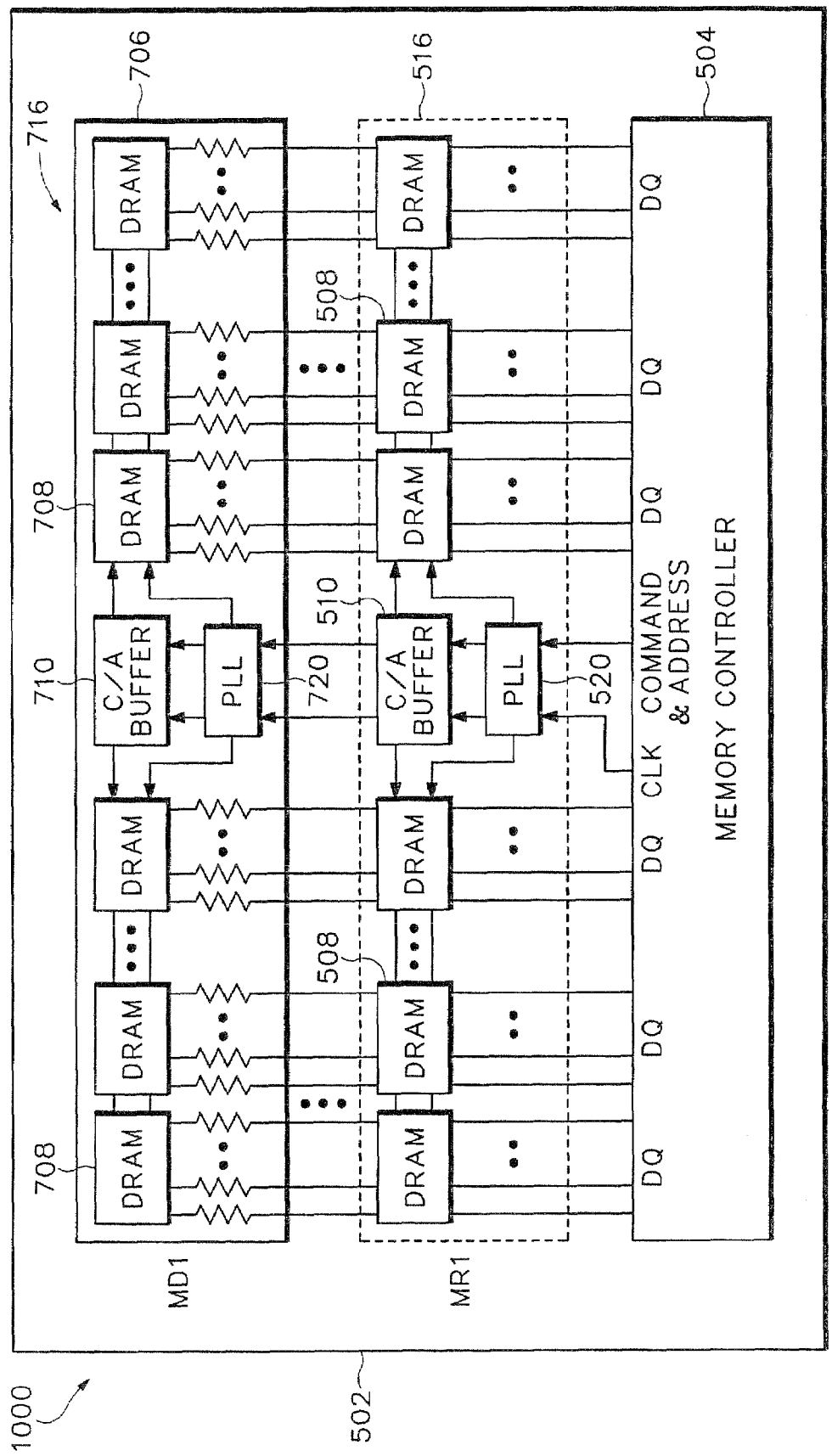
FIG. 10 is a top view of an embodiment of the memory system according to the present invention.

FIG. 10 is a top view of an embodiment of a memory system 1000 according to the present invention. The system 1000 is substantially similar to the system 900 with the addition of a memory module 706. The memory module 716 operates substantially as described earlier with reference to FIG. 7. The memory module 716 includes a PLL 720 that is capable of generating a first clock 1stCLK responsive to the system clock CLK and a module board 706. The PLL 720 provides the 1stCLK signal to its corresponding memory devices 708 on the memory module 716. By adding the PLL 720, the system 1000 avoids having to route the system clock separately to each memory device 508, 708 from the memory controller 504. In another embodiment, the PLL 520, 720 might likewise be replaced with a delay locked loop (DLL) that operates similarly to the PLL 520, 720. That is, the DLL is capable of generating the 1stCLK responsive the system clock CLK and to provide the 1stCLK to its corresponding memory devices 508, 708.

In an embodiment, at least one first memory device 708 receives the command and address signals outputted from the command and address buffer through a second command and address signal trace routed on the motherboard. In an embodiment, the first command and address signal trace is arranged substantially perpendicularly with the second command and address signal trace.

Figure 11:
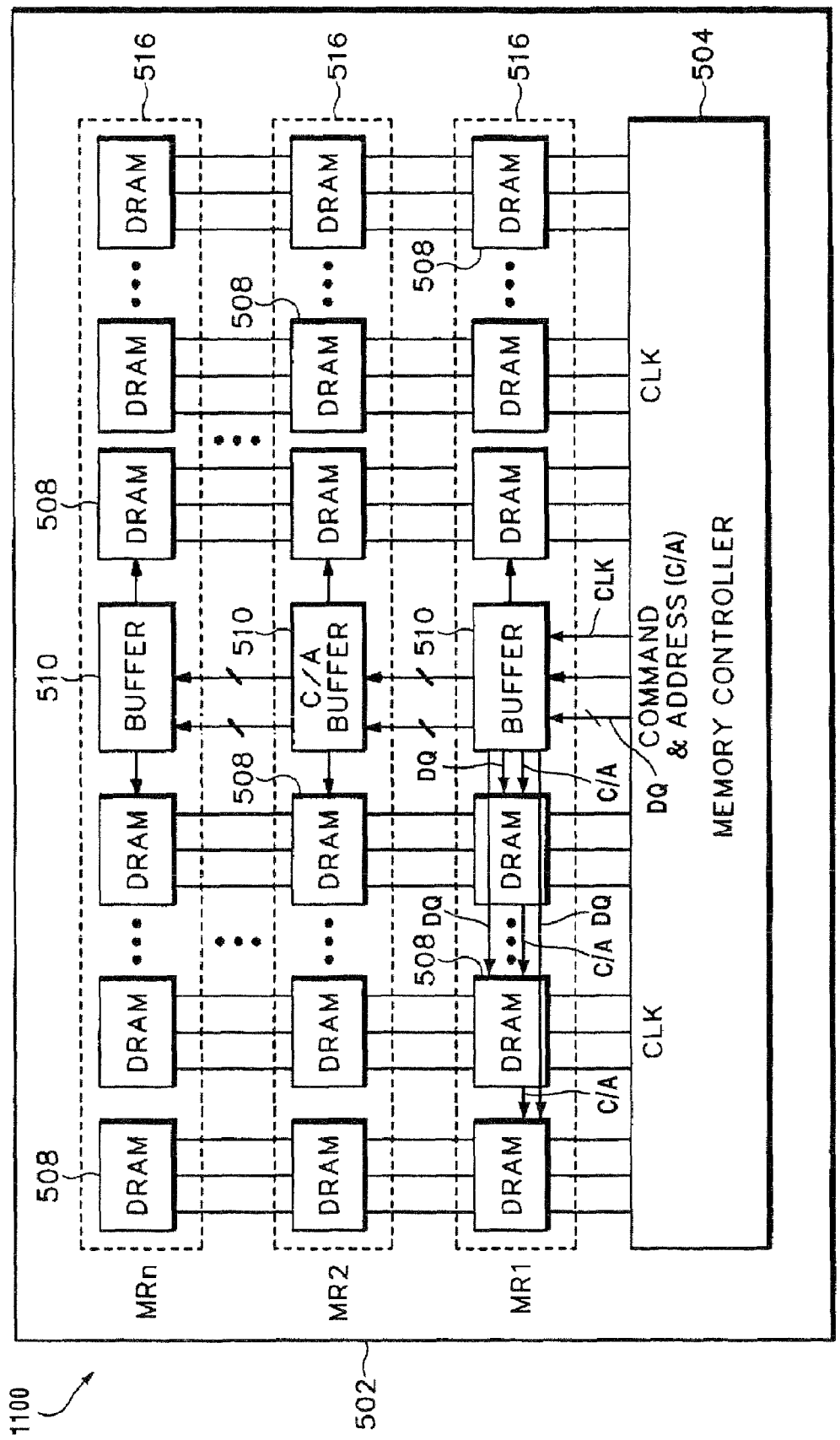
FIG. 11 is a top view of an embodiment of the memory system according to the present invention.

FIG. 11 is a top view of an embodiment of the memory system according to the present invention. The system 1100 is substantially similar to the system 500 shown in FIG. 5, with the exception that the controller 504 can optionally provide the data signals DQ to the buffer 510 that, in turn, provides the data signals DQ to each of the devices 508. Similarly, the controller optionally 504 can provide the system clock CLK to the buffer 510 that, in turn, provides the system clock CLK to each of the devices 508. Put differently, the plurality of memory devices 508 can receive the data signals DQ and the system clock CLK directly from the buffer 510 that, in turn, receives the data signals DQ and the system clock CLK from the controller 504.

Figure 12:
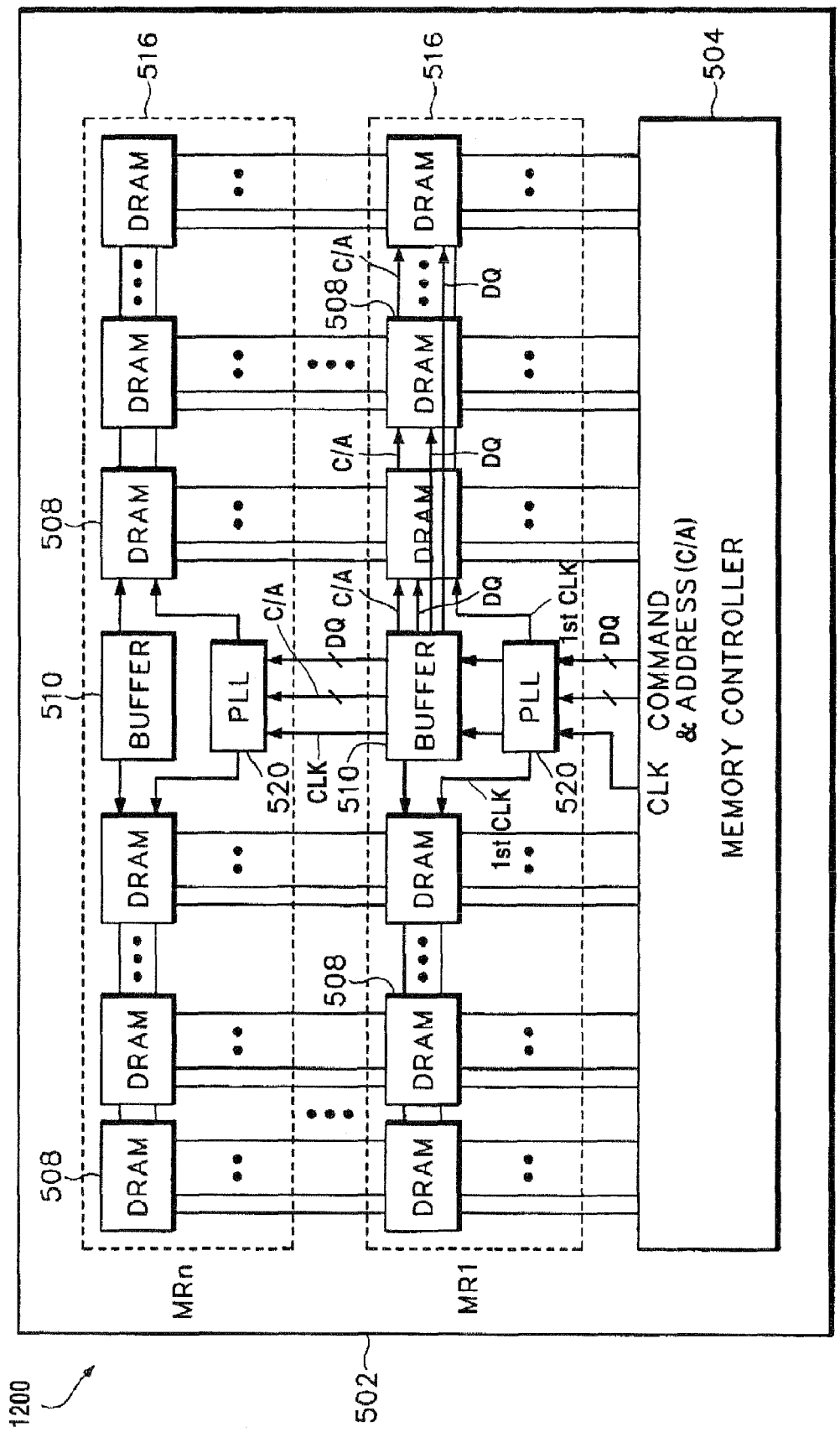
FIG. 12 is a top view of an embodiment of the memory system according to the present invention.

FIG. 12 FIG. 12 is a top view of an embodiment of the memory system according to the present invention. The system 1200 is substantially similar to the system 900 shown in FIG. 9, with the exception that the controller 504 can provide the DQ data signals to the PLL 520 that, in turn, provides the DQ data signals to the buffer 510 and to each of the devices 508. Similarly, the controller 504 can provide the system CLK signal to the PLL 520 that, in turn, provides the system CLK signal to the buffer 510 and to each of the devices 508.

Having illustrated and described the principles of our invention(s), it should be readily apparent to those skilled in the art that the invention(s) can be modified in arrangement and detail without departing from such principles. We claim all modifications coming within the spirit and scope of the accompanying claims.

We claim:
1. A memory system, comprising:
a first buffer chip directly mounted on a motherboard;
at least one first memory chip coupled to the first buffer chip and directly mounted on the motherboard;
a plurality of first signal traces routed on the motherboard to the first buffer chip and the at least one first memory chip; and
a first phase locked loop directly mounted on the motherboard and capable of generating a first clock signal on a second clock trace responsive to a system clock signal on a first clock trace,
wherein the first buffer chip is capable of buffering signals outputted from a memory controller and providing them to the at least one first memory chip,
wherein the at least one first memory chip is operated in synchronization with the first clock signal,
wherein the memory controller generates a command and address signal, and also generates the system clock signal and a data signal, and is mounted directly on the motherboard,
wherein the system eliminates signal reflection caused by signal trace discontinuities of the first buffer chip and the at least one first memory chip by directly mounting the first buffer chip and the at least one first memory chip on the motherboard without an intervening socket.

2. The memory system of claim 1, wherein the at least one first memory chip is one of a DRAM or SDRAM.

3. The memory system of claim 1, wherein the first buffer chip is capable of driving the command and address signal to the at least one first memory chip through corresponding signal traces routed on the motherboard.

4. The memory system of claim 3, wherein the first buffer chip receives the command and address signal from the memory controller through a first command and address signal trace routed on the motherboard.

5. The memory system of claim 4, wherein the at least one first memory chip receives the command and address signal outputted from the first buffer chip through a second command and address signal trace routed on the motherboard, and the first command and address signal trace is arranged substantially perpendicular to the second command and address signal trace.

6. The memory system of claim 1, wherein the first buffer chip is capable of driving the data signal to the at least one first memory chip through corresponding signal traces routed on the motherboard.

7. The memory system of claim 6, wherein the first buffer chip receives the data signal from the memory controller through a first data signal trace routed on the motherboard.

8. The memory system of claim 7, wherein the at least one first memory chip receives the data signal outputted from the first buffer chip through a second data signal trace routed on the motherboard, and the first data signal trace is arranged substantially perpendicular to the second data signal trace.

9. The memory system of claim 1, wherein the first clock trace is arranged substantially perpendicular to the second clock trace.

10. The memory system of claim 1 further comprising:
at least one memory module electrically coupled to the memory controller through a socket mounted on the motherboard,
wherein the at least one memory module is located further from the memory controller than the at least one first memory chip.

11. The memory system of claim 10, wherein the at least one memory module comprises:
a second buffer chip mounted on a module board of the at least one memory module;
at least one second memory chip mounted on the module board of the at least one memory module and coupled to the second buffer chip; and
a plurality of second signal traces routed on the module board to the second buffer chip and the at least one second memory chip,
wherein the second buffer chip is capable of buffering signals outputted from the memory controller and providing them to the at least one second memory chip.

12. The memory system of claim 11, wherein the at least one first memory chip is one of a DRAM or SDRAM, and the at least one second memory chip is one of DRAM or SDRAM.

13. The memory system of claim 11, further comprising:
a second phase locked loop mounted on the module board and capable of generating a second clock signal in response to the system clock signal,
wherein the at least one second memory chip is operated in synchronization with the second clock signal.

14. The memory system of claim 11, further comprising:
a second delay locked loop mounted on the module board and capable of generating a second clock signal in response to the system clock signal,
wherein the at least one second memory chip is operated in synchronization with the second clock signal.

15. A memory system, comprising:
a first buffer chip directly mounted on a motherboard;
at least one first memory chip coupled to the first buffer chip and directly mounted on the motherboard;
a plurality of first signal traces routed on the motherboard to the first buffer chip and the at least one first memory chip; and a first delay locked loop directly mounted on the motherboard and capable of generating a first clock signal on a second clock trace responsive to a system clock signal on a first clock trace, wherein the first buffer chip is capable of buffering signals outputted from a memory controller and providing them to the at least one first memory chip, wherein the at least one first memory chip is operated in synchronization with the first clock signal, wherein the memory controller generates a command and address signal, and also generates the system clock signal and a data signal, and is mounted directly on the motherboard, and wherein the system eliminates signal reflection caused by signal trace discontinuities of the first buffer chip and the at least one first memory chip by directly mounting the first buffer chip and the at least one first memory chip on the motherboard without an intervening socket.

16. The memory system of claim 15, wherein the first clock trace is arranged substantially perpendicular to the second clock trace.

17. The memory system of claim 15, further comprising:

at least one memory module electrically coupled to the memory controller through a socket mounted on the motherboard, wherein the at least one memory module is located farther from the memory controller than the at least one first memory chip.

18. The memory system of claim 17, wherein the at least one memory module comprises:

a second buffer chip mounted on a module board of the at least one memory module;

at least one second memory chip mounted on the module board of the at least one memory module and coupled to the second buffer chip; and a plurality of second signal traces routed on the module board to the second buffer chip and the at least one second memory chip, wherein the second buffer chip is capable of buffering signals outputted from the memory controller and providing them to the at least one second memory chip.

19. The memory system of claim 18, further comprising:

a second delay locked loop mounted on the module board and capable of generating a second clock signal in response to the system clock signal, wherein the at least one second memory chip is operated in synchronization with the second clock signal.

20. The memory system of claim 17, wherein the at least one first memory chip is one of a DRAM or SDRAM, and the at least one second memory chip is one of DRAM or SDRAM.

* * * * *